United States Patent [19]

Sibbach et al.

[11] Patent Number: 4,912,103
[45] Date of Patent: Mar. 27, 1990

[54] WATER VAPOR BARRIER LAMINATE FOR PACKAGING

[75] Inventors: William R. Sibbach, Hoffman Estates; Roger P. Conant, Glencoe, both of Ill.

[73] Assignee: Jefferson Smurfit Corporation, Clayton, Mo.

[21] Appl. No.: 190,382

[22] Filed: May 5, 1988

[51] Int. Cl.⁴ .............................................. B32B 7/02
[52] U.S. Cl. ..................................... 428/215; 428/349; 428/482; 428/483; 428/516; 428/523
[58] Field of Search ............... 428/349, 482, 483, 215, 428/523, 516, 500

[56] References Cited

U.S. PATENT DOCUMENTS 4,352,850 10/1982 Yamamoto et al. ................. 428/483
4,705,707 11/1987 Winter .................................. 428/483
4,753,845 6/1988 Sumi et al. ........................... 428/483

Primary Examiner—George F. Lesmes
Assistant Examiner—Alisa A. Harbin
Attorney, Agent, or Firm—Richard W. Carpenter

[57] ABSTRACT

A transparent, flexible, heat sealable, water vapor barrier laminate, for use in forming a protective package, which is formed from three layers secured to each other by separate layers of laminating adhesive. One outer layer is a protective material consisting of a polyester film; the center layer is a barrier material consisting of a fluid compression rolled, monoaxially molecuarly oriented, high density polyethylene film; and the other outer layer is another protective material consisting of an ionomer film.

5 Claims, 1 Drawing Sheet

WATER VAPOR BARRIER LAMINATE FOR PACKAGING

BACKGROUND OF THE INVENTION

1. Field of the Invention

This invention relates to flexible packaging, and more particularly to a transparent, flexible, heat sealable, water vapor barrier laminate for use in a protective package for long time storage of sensitive mechanical and electrical components.

2. Description of Background Art

A background art search directed to the subject matter of this application conducted in the United States Patent and Trademark Office disclosed the following U.S. Pat. Nos.: 2,402,982; 2,439,716; 2,631,954; 2,659,934; 2,679,969; 2,816,883; 2,822,357; 2,956,723; 3,294,387; 3,504,075; 3,446,631; 3,524,795; 3,549,389; 3,817,821; 3,836,425; 3,988,499; 4,147,291; 4,147,827; 4,183,435; 4,188,441; 4,209,126; 4,211,326; 4,288,215; 4,258,848; 4,352,850; 4,442,158; 4,469,741; 4,564,545.

None of these prior art patents discloses a transparent, flexible, heat sealable, water vapor barrier laminate for a protective package, which laminate includes a center layer of barrier material that consists of monoaxially molecularly oriented high density polyethylene film, a first outer protective layer of polyester film, and a second outer protective layer of a heat sealable ionomer film, with the outer layers adhesively secured to the inner layers by a laminating adhesive material.

SUMMARY OF THE INVENTION

It is an object of the present invention to provide a transparent, flexible, heat sealable, water vapor barrier laminate for use in forming a protective package for mechanical and electrical components that require extended periods of storage time.

It is another object of the invention to provide a laminate for use in packaging that meets military specification MIL-B-22191 for Type I material, which is waterproof, greaseproof, and has a maximum water vapor transmission rate of 0.03 grams per 100 square inches per 24 hours, as well as other specifications with similar standards.

Such a package should have minimum water vapor transmission rate characteristics. It must be oil resistant and puncture resistant. It must be able to resist ageing and abrasive action. It must have sufficient storage capacity to afford strong, safe shelf life for the products packaged therein. It must also be able to resist pressure changes, because it is the type of package used for parts that have to undergo severe pressure changes in submarines or airplanes.

A more specific object of the invention is the provision of a transparent, flexible, heat sealable, water vapor barrier, three ply laminate that includes a center layer of a barrier material that consists of a fluid compression rolled, monoaxially molecularly oriented, high density polyethylene film and protective outer layers of film, one of which is heat sealable, which outer layers are bonded to opposite surfaces of the center layer by water resistant laminating adhesives.

These and other objects of the invention will be apparent from an examination of the following description and drawings.

DESCRIPTION OF THE PREFERRED EMBODIMENT

Figure 1:
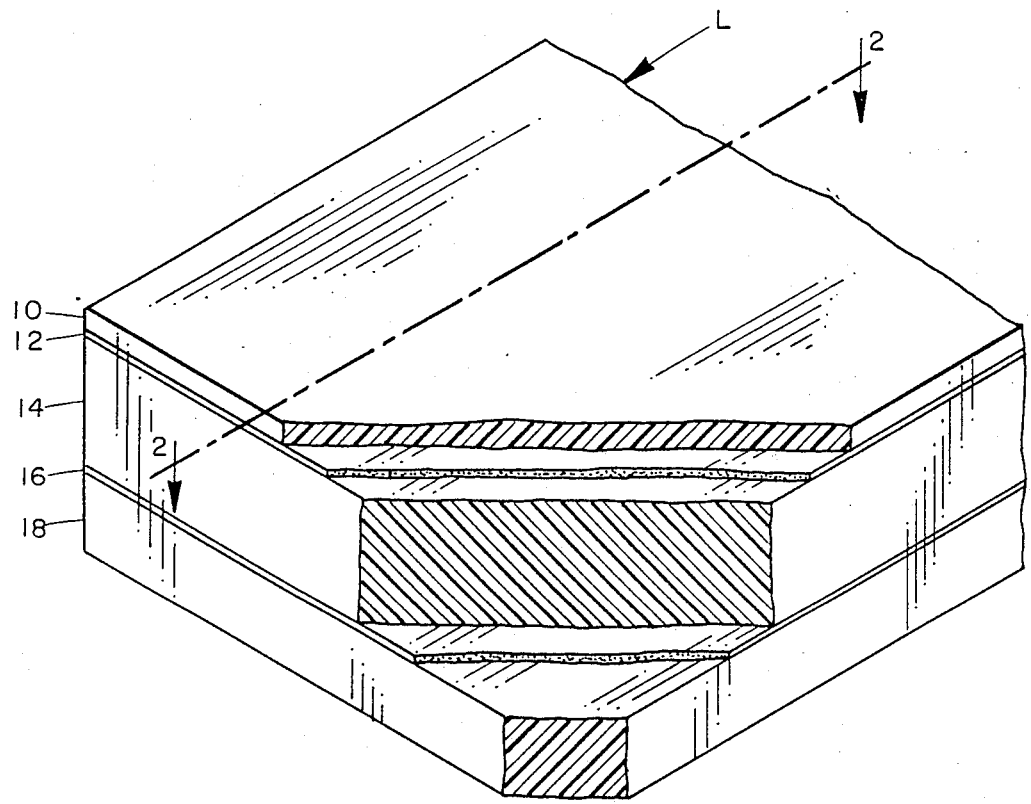
FIG. 1 is a fragmentary perspective view, with portions of the structure shown in vertical cross section, of a portion of a laminate which can be used to form bags or pouches, and which embodies features of the present invention.
Figure 2:
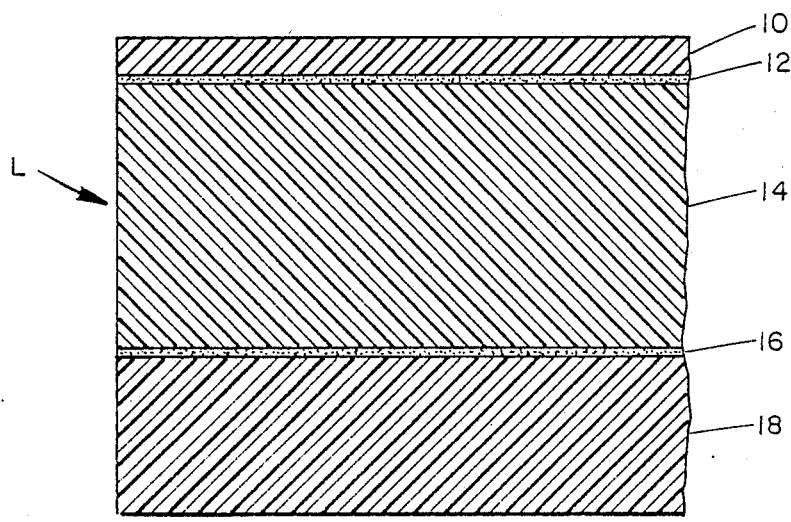
FIG. 2 is a fragmentary, transverse, vertical, cross section taken on line 2—2 of FIG. 1.

Referring now to the drawings for a better understanding of the invention, it will be seen that the laminate is a multilayer structure having three layers of film bonded to each other by layers of a water resistant laminating adhesive.

The essential feature of the invention resides in the provision of the center layer 14, which has the water vapor barrier characteristics required to meet the very demanding standards of military specification MIL-B-22191 and to provide a package for protecting the packaged articles as required. The center layer 14 of the laminate is a fluid compression rolled, monoaxially molecularly oriented, high density polyethylene film.

Bonded to the outer surface of center layer 14 is a protective outer layer 10 which consists of a polyester such as polyethylene terephthalate (PET) film.

Bonded to the inner surface of center layer 14 is an inner layer 18 of another protective material that is heat sealable and consists of an ionomer film derived from ethylene/methacrylic acid copolymer.

Inner film layer 10 and outer film layer 18 are is bonded to center film layer 14 by layers 12 and 16, respectively, a of water resistant laminating adhesive material consisting of a two component, catalyzed polyester.

Although the center layer 14 has exceptional moisture barrier characteristics, it is not heat sealable, and it does not have tear strength in both directions.

For these reasons it is necessary to provide a protective coating layer on each side of the center layer. The outer layer in the present invention is a polyester, such as polyethylene terephthalate film, which is extremely tough and durable. It does not have to be heat sealable, because the inner layer is heat sealable.

The inner layer is a preferably an ionomer film derived from ethylene methacrylic acid copolymer resin and is exceptionally tough and durable and also provides excellent heat sealing characteristics.

Among these heat sealing characteristics are: higher hot tack strength, lower temperature sealing, better sealing through liquid and powder contamination, broad heat sealing range, and higher heat seal strengths.

The inner protective layer must be tough in several respects such as: abrasion resistance, puncture toughness, tear propagation, tensil and elongation, and low temperature toughness.

The optimum thicknesses and the ranges for the various layers of the laminate of the present invention are preferably as follows:

| LAYER | OPTIMUM | RANGE |
| --- | --- | --- |
| Layer 10 | 0.5 mils | From 0.25 to 1.0 mils |
| Layer 12 | 0.1 mils | From 0.075 to 0.25 mils |
| Layer 14 | 3.25 mils | From 2.0 to 6.0 mils |
| Layer 16 | 0.1 mils | From 0.075 to 0.25 mils |

| LAYER | OPTIMUM | RANGE |
|---|---|---|
| Layer 18 | 2.0 mils | From 1.0 to 4.0 mils |

Thus, it will be appreciated that the invention provides a laminate structure suitable for use in the safe and protective packaging, for long periods of time, of sensitive articles, because it has excellent water vapor barrier characteristics, is flexible, is transparent, and has excellent heat sealing characteristics. A package of this type is capable of meeting military specification MIL-B-22191 for Type I material.

What is claimed is:

1. A transparent, flexible, heat sealable, water vapor barrier laminate for use in forming a protective package that qualifies as meeting United States Military Specification Type I MIL-B-22191 by having a maximum moisture vapor transmission rate of 0.03 grams per 100 square inches per 24 hours, comprising:
   (a) a first layer of a protective material consisting of a polyester film;
   (b) a second layer of a water resistant, laminating adhesive material consisting of a two component, catalyzed polyester;
   (c) a third layer of a barrier material which consists of a fluid compression rolled, monoaxially molecularly oriented, high density polyethylene film;
   (d) a fourth layer of a water resistant, laminating adhesive material consisting of a two component, catalyzed polyester;
   (e) a fifth layer of a heat sealable, protective material consisting of an ionomer film derived from ethylene/methacrylic acid copolymer resin.

2. A transparent, flexible, heat sealable, water vapor barrier laminate for use in forming a protective package that qualifies as meeting type I United States Military Specification MIL-B-22191D by having a maximum moisture vapor transmission rate of 0.03 grams per 100 square inches per 24 hours, comprising:
   (a) a first layer of a protective material consisting of polyester film;
   (b) a second layer of a water resistant, laminating adhesive material;
   (c) a third layer of a barrier material which consists of a fluid compression rolled, monoaxially molecularly oriented, high density polyethylene film;
   (d) a fourth layer of a water resistant, laminating adhesive material;
   (e) a fifth layer of a heat sealable, protective material consisting of an ionomer film.

3. A laminate according to claim 2, wherein the thicknesses of the layers of material are in the following ranges:
   First Layer from 0.25 to 1.0 mils
   Second Layer from 0.075 to 0.25 mils
   Third Layer from 2.0 to 6.0 mils
   Fourth Layer from 0.075 to 0.25 mils
   Fifth Layer from 1.0 to 4.0 mils.

4. A laminate according to claim 2, wherein the thicknesses of the layers of material are as follows:
   First Layer 0.5 mils
   Second Layer 0.1 mils
   Third Layer 3.25 mils
   Fourth Layer 0.1 mils
   Fifth Layer 2.0 mils.

5. A laminate according to claim 2, wherein said ionomer film is a polyolefin film.

* * * * *